United States Patent [19]
Dueker et al.

[11] 3,870,887
[45] Mar. 11, 1975

[54] OPTICAL IMAGE POSITION INDICATOR MEANS USING TIME AND PHASE DELAY SENSING

[75] Inventors: James E. Dueker; Lloyd E. Brunkhorst, both of Florissant, Mo.

[73] Assignee: McDonnell Douglas Corporation, St. Louis, Mo.

[22] Filed: Oct. 10, 1973

[21] Appl. No.: 405,022

[52] U.S. Cl.............. 250/370, 250/211 J, 250/394, 357/30
[51] Int. Cl. .............................................. G01t 1/16
[58] Field of Search.......... 317/235; 250/211 J, 370, 250/332, 371, 394; 357/30

[56] References Cited
UNITED STATES PATENTS

| | | | |
|---|---|---|---|
| 3,207,902 | 9/1965 | Sandborg........................... | 250/370 |
| 3,210,546 | 10/1965 | Perron................................. | 250/332 |
| 3,529,161 | 9/1970 | Oosthock et al.................... | 250/370 |
| 3,582,654 | 6/1971 | Meukman........................... | 250/370 |

Primary Examiner—Harold A. Dixon
Attorney, Agent, or Firm—Charles B. Haverstock

[57] ABSTRACT

A radiation detecting device including means using time or phase delay sensing means to indicate the position of a source of radiation independently of the source radiation characteristics and independent of amplitude and background of the radiation.

18 Claims, 16 Drawing Figures

LATERAL DETECTOR CROSS SECTION

IMPULSE INPUT AND OUTPUT AS A FUNCTION OF TIME

CONTINUOUS WAVE INPUT AND OUTPUT AS A FUNCTION OF TIME

OPTICAL IMAGE POSITION INDICATOR MEANS USING TIME AND PHASE DELAY SENSING

There are many radiation detecting and sensing devices in existence including electroluminescent phosphur devices, semi-conductive devices that employ Schottky barriers and *p-n* junctions, and various photovoltaic devices. The known devices have also included means for indicating or detecting the position of a radiation source by various means including the use of spaced output electrodes and means which respond to the amplitude and relative amplitude of signals generated in the devices. Some of the known devices have also made use of background radiations to develop positional information. Examples of known devices used for indicating or locating the position of a source of radiation are disclosed in the following listed U.S. letters Pat. Nos. 3,354,313; 3,369,125 and 3,693,013, all of which are assigned to Applicant's assignee.

The present construction differs from the prior art constructions, including those disclosed in the above patents because, among other things, it includes a junction photo-detector which makes use of the principle that a nonuniformly irradiated junction produces photovoltages in the detector that are in a direction that is parallel to or nearly parallel to the detector junction. This means that by proper placement of electrodes on the surfaces of the detector adjacent to the junction, an X-Y coordinate system can be established which provides rectilinear positional data of an image impinging thereon from a radiating object or source. The present construction also represents an important improvement over the known constructions by being relatively simple structurally, having no movable parts, and employing a semi-conductor junction device such as a p-n junction device which has some electrodes located on one side of the junction and at least one other electrode located on the opposite side of the junction. Some of the electrodes that are used preferably make relatively small or point contact with the device and some of these are preferably located on the same diameter of the device at locations equally spaced from opposite sides of the center thereof. At least one other electrode is a larger electrode and in the construction shown is an annular peripheral electrode located on the opposite side of the device from the smaller electrodes, said peripheral electrode preferably being centered on the detector and located outwardly from the small contact electrodes. When incident radiations impinge on the subject detector, electric signals are produced at the various point contact electrodes and these signals occur at later times that take into account or are functions of the mobility of the charge carrier characteristics of the layer on which the point contact electrodes are located. The values of the magnitudes of the signals produced at the various electrodes with respect to each other is relatively unimportant so long as the signals are large enough to be detectable. So far as known, no reference device measures responses in this way and takes into account lateral charge mobility characteristics to produce delays or phase changes. The charge mobility of a semi-conductor is similar or analogous to the impedance characteristic of electrical devices. If the input incident radiation undergoes some disturbance or change, either accidentally or intentionally, there will be a time delay before the disturbance is observed or sensed at the various spaced lateral or contact electrodes. Such disturbances can take the form of changes in the position of impingement of the radiations on the surface of the detector as well as other forms. Time or phase delays measured in this way are proportional to the displacement between the position where the input radiations impinge and the lateral electrodes at which signals are produced. The present construction makes use of these delays in several ways depending upon the characteristics of the input radiations including the manner in which it changes position or otherwise.

It is therefore a principal object of the present invention to provide improved and novel means for locating a radiation source in an observed field of view.

Another object is to provide means for producing time or phase delays which are proportional to the displacement between the position where input radiations impinge on a light sensitive detector relative to two or more laterally spaced electrodes located thereon.

Another object is to teach the construction and operation of a lateral detector capable of responding to different forms of input modulation of a radiation source including impulse modulated inputs and continuous wave modulated inputs.

Another object is to teach the construction and operation of a relatively simple and inexpensive lateral detector device which produces responses proportional to time or phase delay taking into account the lateral charge mobility characteristics of semi-conductor materials used in the construction of the device.

Another object is to provide optical image position indicator means that make use of time and/or phase delay sensing means to establish positional information as to the location of a source of radiation.

Another object is to teach the construction and operation of a radiation detector which produces outputs that are relatively independent of the source of radiation, the amplitude of the incident radiations and background radiations that may be present.

Another object is to teach the construction and operation of the device that develops positional information without having or requiring any moving parts.

Another object is to teach the construction of a semi-conductor junction type photo-detector which produces photovoltages parallel or substantially parallel to the junction.

Another object is to produce outputs from an optical detector device that includes time or phase information due to the mobility of charge carriers in portions of the device.

Another object is to teach the construction of means that sense delays produced when input radiations impinging on an optical detector are disturbed or interrupted in some way such as by a changes in their positions of impingement.

These and other objects and advantages of the present optical detector means will become apparent after considering the following detailed specification which discloses preferred embodiments thereof in conjunction with the accompanying drawings, wherein.

Figure 1:
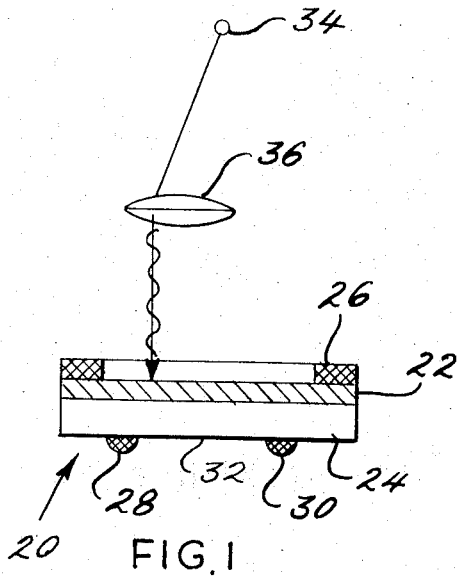
FIG. 1 is a cross-sectional view taken through the center of a lateral detector constructed according to one embodiment of the present invention.
Figure 2:
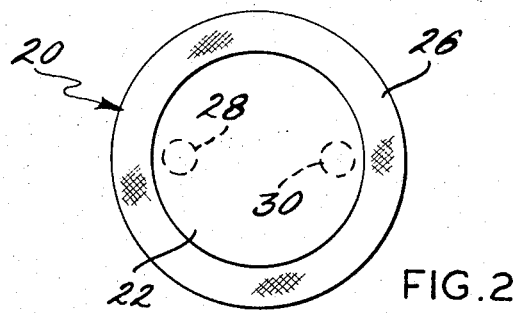
FIG. 2 is a top plan view of the detector of FIG. 1.

Referring to the drawings more particularly by reference numbers, number 20 refers to and identifies a detector or detector wafer constructed according to one form of the present invention. In the embodiment shown in FIG. 1, the detector 20 is shown as being a p-n junction device having a layer 22 of a p-type semiconductor material and a layer 24 of an n-type semiconductor material. The p-layer 22 in the embodiment as shown is the input or the layer on which input radiations from a remote source impinge. This layer has attached to it or formed on it a peripheral electrode 26 of a conductive material, and in the form shown is annular in shape. The electrode 26 can be applied or attached to the p-layer in a number of ways such as by depositing metal particles which are first evaporated and then allowed to condense or settle on the p-layer or it can be attached or applied in other known ways.

On the opposite side of the detector 20 from the peripheral electrode 26, and at locations preferably located within the area outlined by the electrode 26 are located a plurality of spaced point or ohmic contact electrodes 28 and 30, two being shown in the drawing. The electrodes 28 and 30 in the round embodiment shown are located so as to be equidistant from the center 32 of the device and are also located on a diameter thereof.

The detector 20 as shown is designed and constructed to be used in systems or devices to indicate or provide signals to indicate the position or location of a source of radiation. One of the important features of the present device is that it produces outputs which are relatively independent of the source of radiation, of the amplitude of the input radiation, as well as of the background radiation, and it develops the desired positional information without having or requiring any moving parts or complicating mechanisms. The present device operates by producing photovoltages which are in a plane parallel or nearly parallel to the junction between the detector layers 22 and 24 and this is true even when the junction is non-uniformly radiated by the energy from the source to be located. In order to accomplish this the spaced electrodes 28 and 30 must be properly located as indicated to be able to establish rectilinear positional data of the impinging image from the radiating source or object such as from the object 34 in FIG. 1.

Figure 3:
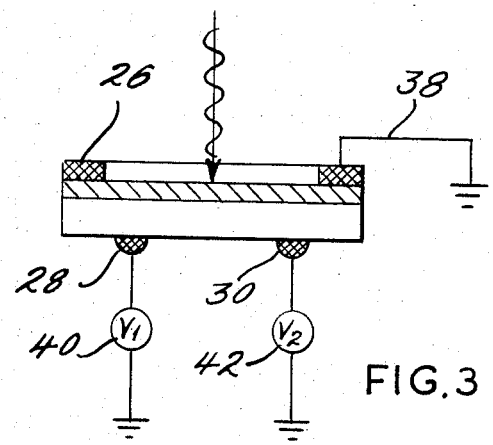
FIG. 3 is similar to FIG. 1 but also shows circuit connections for use with the subject detector.

The input radiation from the object 34 is applied as incident radiation to the p-n junction and is shown being focused on the detector 20 as a spot or area by means of a lens or lens system indicated generally by the number 36. The input radiation from the object or source 34 may be further identifiable by being modulated in some way such as by being pulse modulated or the radiation may be in the form of a continuous wave such as a sine wave. The radiation may also be identifiable by frequency, and the source may be a device such as a laser or mode-locked laser. In FIG. 3 the input radiation is represented by an arrow that is directed at a specific location on the surface of the detector shown as being the location equidistant between the electrodes 28 and 30 which is also the center of the detector.

FIG. 3 also shows typical simplified circuit connections which make operation of the subject detector possible. For example, the peripheral electrode 26 is shown connected to ground by lead 38, the electrode 28 is shown connected through a voltage indicator device 40 to ground, and the electrode 30 is similarly grounded through voltage indicator device 42. The indicator devices 40 and 42 provide respective indications as to the magnitude of the voltages produced at the respective electrodes 28 and 30. The indicator means 40 and 42 can be voltmeters, oscilloscopes, or some other form of electronic indicator or recorder device. Another pair of spaced electrodes can also be provided at an angle to the electrodes 28 and 30 to provide information signals to locate an object in two directions.

If the input radiation impinging on the subject detector 20 is disturbed in some manner such as by a change in its position of impingement, a time delay will take place before the disturbance or change can be detected and observed as changes in the signal responses produced at the electrodes 28 and 30. This fact is important to understand the operation of the device. Furthermore, time delays that are produced due to input changes will be proportional to the displacement between the position where the input radiation impinges and the lateral electrodes at which the responses are being observed.

Figure 4:
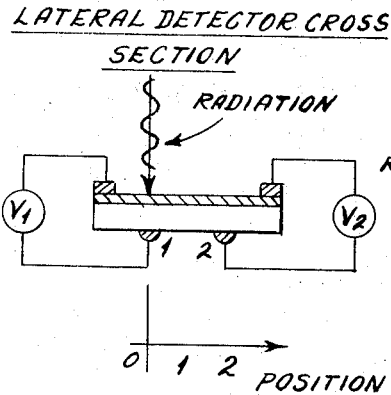
FIG. 4 shows another embodiment of the subject detector with the incident radiation impinging thereon at a location that is opposite to one of the detector electrodes.
Figure 4A:
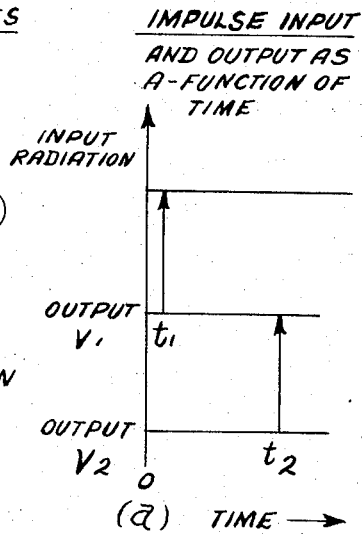
FIGS. 4A and 4B are graphs, plotted to show input radiation as a function of time, graph 4A showing the relationship for inputs that are impulse modulated, and graph 4B showing the relationship for continuous wave inputs.
Figure 5:
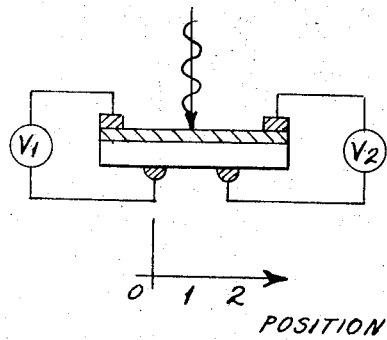
FIG. 5 is a view similar to FIG. 4 but shows the incident radiation impinging at a point midway between two spaced detector electrodes.
Figure 5A:
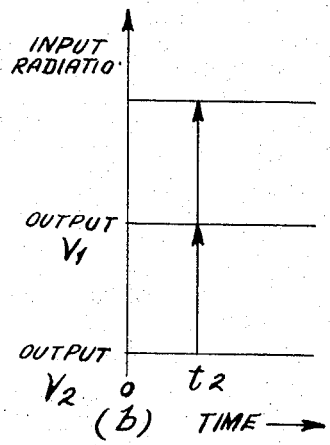
FIGS. 5A and 5B are graphs of input radiation plotted as a function of time for the same kinds of inputs shown in FIGS. 4A and 4B, respectively.
Figure 5B:
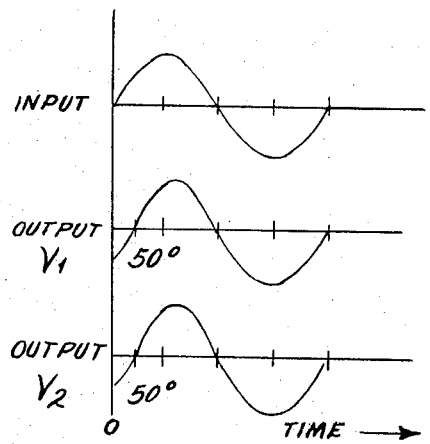
Figure 6:
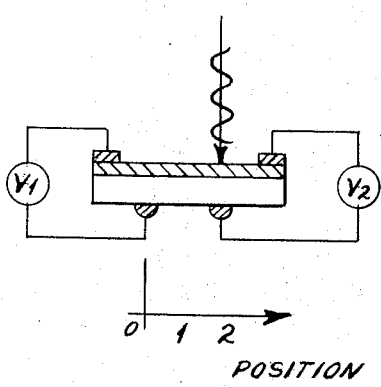
FIG. 6 is also similar to FIGS. 4 and 5 but shows the condition where the incident radiation impinges on the device at a location that is opposite the other of the said two spaced electrodes.
Figure 6A:
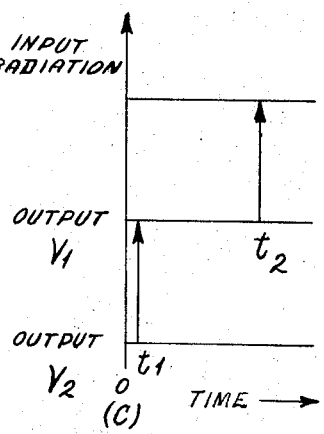
FIGS. 6A and 6B are graphs of input radiation plotted as a function of time for the conditions of pulsed and continuous wave inputs.
Figure 6B:
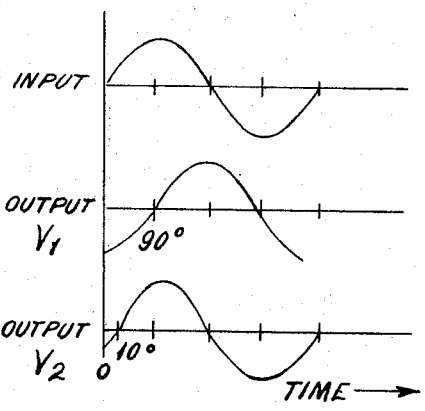

FIGS. 4, 5 and 6 show three different conditions which help to explain this phenomenon. In FIG. 4 the input radiation is shown impinging opposite to the electrode 28; in FIG. 5 the input radiation impinges opposite the center of the detector which is located equidistant between the electrodes 28 and 30; and in FIG. 6 the input radiation impinges opposite the electrode 30. In each of these cases the input radiations are shown having two different forms either the form of impulses (see graphs in FIGS. 4A, 5A and 6A) or the form of a continuous wave such as a sine wave (see graphs 4B, 5B and 6B).

In the case shown in FIG. 4 where the input radiation impinges opposite the electrode 28 at time $t_o$, the output at indicator 40 is observed at time $t_1$ and the output at indicator 42 is observed at time $t_2$. The time difference between the occurence of these indications is illustrated by the graph of FIG. 4A. Note that there is a slight time difference between the time an input radiation pulse impinges on the detector and the time it is sensed by the indicator connected to electrode 28. This relatively short time period takes into account the thickness of the n-layer 24 and the charge carrier mobility thereof which is a characteristic of the material selected for use in the layer 24. In the case of the signal produced by the indicator 42 which is connected to the electrode 30, there is a significantly longer time delay and this is occasioned by the time required for the signal to traverse the slant distance which depends on the lateral as well as the thickness of the detector from where the input impinges to the detector 30. This also depends on the charge carrier mobility of the material in the n-layer 24. This time represents a detectable useful time delay equal to $t_2 - t_1$. The magnitude of the signal produced and the intensity of the input radiation have no particular bearing on the outputs produced so long as the responses produced by the impinging radiations are detectable. This is very important to understand.

Figure 4B:
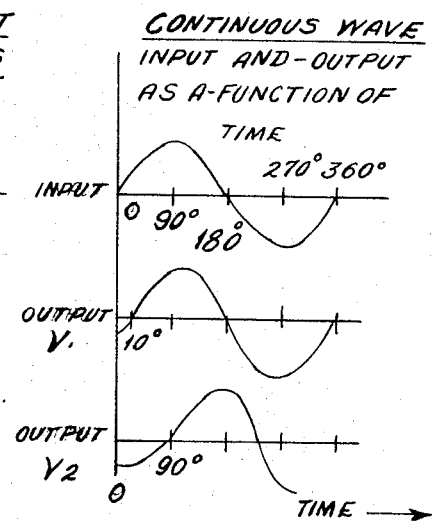

If the input impinging radiation is in the form of a continuous wave such as a sine wave or a wave of some constant symmetric modulation, instead of being a pulsed source, then the relationship of the signals detected at the electrodes 28 and 30 are as shown in FIG. 4B. This situation is more accurately described as being a phase relationship situation not a time delay relationship as in the above case. The principles of operation, however, are basically the same in both cases.

The three different positions of impingement of the input radiation as shown in FIGS. 4, 5 and 6 produce output signals at the electrodes 28 and 30 which have the time or phase relationships shown in the corresponding graphs of FIGS. 4A, 4B, 5A, 5B, 6A and 6B.

Figure 7:
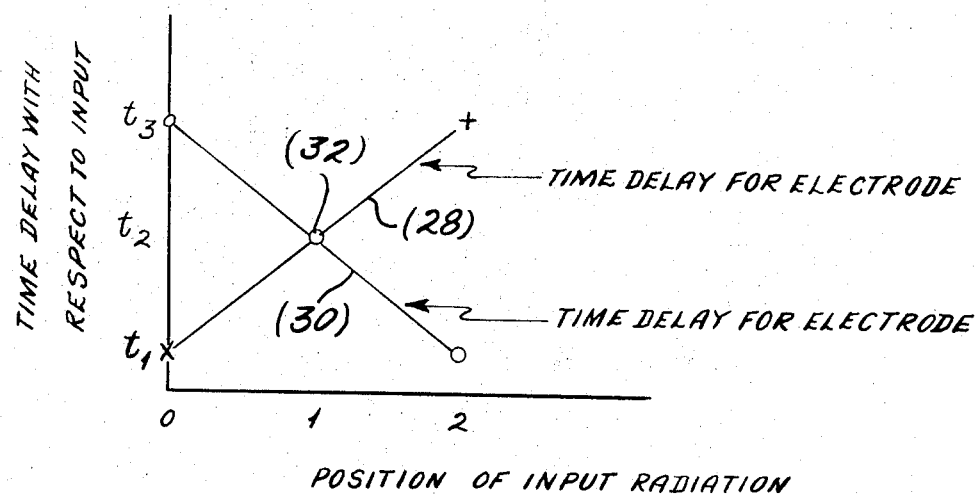
FIG. 7 is a graph of time delay plotted as a function of the position of impingement of input radiation for a detector having two spaced electrodes.

FIG. 7 graphically illustrates how the output time delay, for an impulse input at time $t_o$, varies timewise as a function of the position of impingement of the input radiations. Graph line (28) represents the time delay with respect to the electrode 28 as the input radiation moves from a position opposite the electrode 28 to a position opposite the electrode 30. As expected when the input radiations impinge opposite electrode 28 the time delay with respect thereto is at a minimum with respect to the outputs produced thereat for the reasons indicated, and by the same token when the input is opposite electrode 30 the time of occurrence of the signal resulting therefrom at the electrode 28 is delayed relative to the time of its occurrence by a much greater time interval. Graph line (30) shows the similar situation with respect to the signals generated at the electrode 30. The graph lines (28) and (30) intersect at (32) which corresponds to the situation wherein the radiation impinges at the center of the detector 20 or equidistant between the electrodes 28 and 30.

As explained above in the case of impulse inputs, the outputs are expressed in terms of time delays whereas in the case of continuous wave inputs such as sine wave inputs the outputs are expressed in terms of phase delays. This is clearly evident by comparing the results shown in the graphs of FIGS. 4A, 5A and 6A with the corresponding results in the graphs of FIGS. 4B, 5B and 6B.

Figure 8:
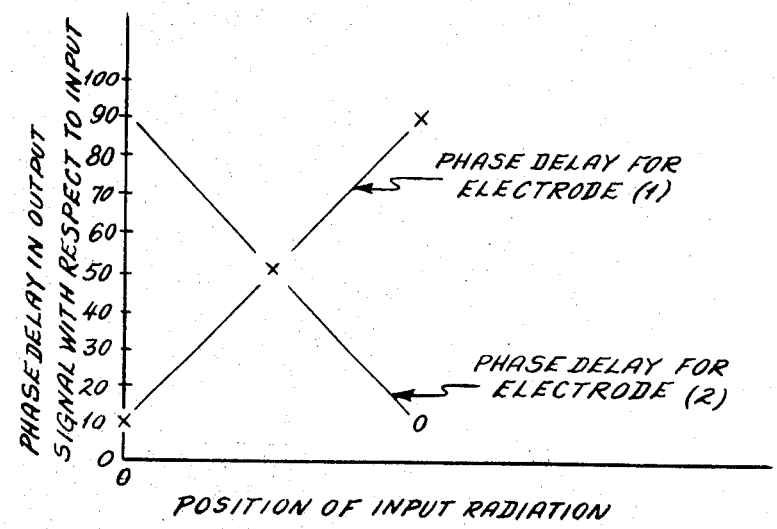
FIG. 8 is a graph of phase delay plotted as a function of the position of impingement of the input radiation for a construction having two spaced detector electrodes.

FIG. 8 is similar to FIG. 7 but shows the relationships as expressed in terms of phase delay instead of time delay with respect to the input radiation. It is not always possible or easy to accurately obtain this type of information from a practical standpoint especially with respect to the time or phase of the input radiation, and furthermore, the exact time of occurrence of an impulse and the exact phase of a continuous wave are not always known or easy to ascertain. To obviate these technical difficulties it is therefore usually necessary to make the measurements with respect to the lateral electrodes, that is to make these measurements at each electrode with respect to the other, which other electrode then serves as the reference. If this is done then it is usually not necessary to know the exact time or phase of the input since it can then be neglected.

Figure 9:
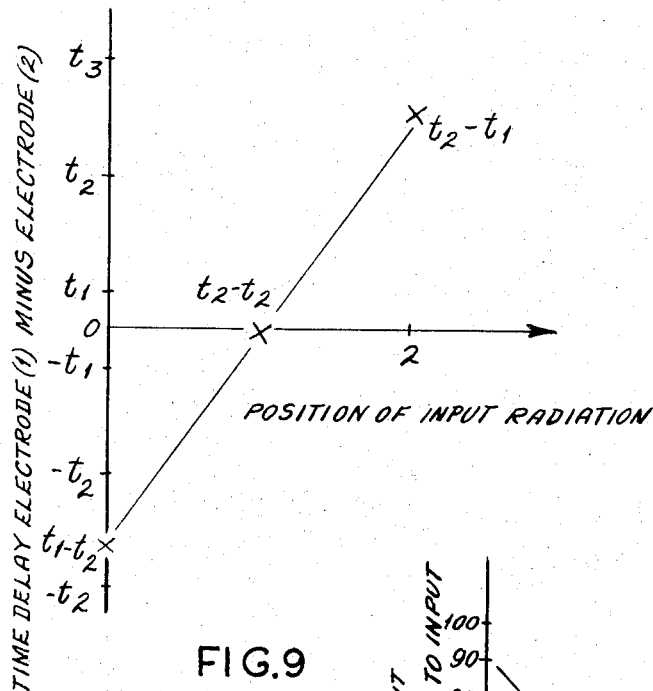
FIG. 9 is a graph of the time difference or delay with respect to the two detector electrodes plotted as a function of the position of impingement of input radiation; and, FIG. 10 is a graph of the difference between the phase delays of the signals generated at the two spaced detector electrodes plotted as a function of the position on the detector where the input radiation impinges.

FIG. 9 is a graph wherein the time of the input is neglected. In this graph the ordinate is calibrated to represent the time delay between the spaced electrodes 28 and 30 and the abscissa is calibrated in terms of the position on the detector where the input impinges. The place where the graphline crosses the abscissa at 1 corresponds to the center of the detector and the 0 and 2 positions on the abscissa correspond to the positions where the two electrodes are located. In this graph time delay is indicated positively and negatively in terms of the difference in the time of occurrence of the responses generated at the electrodes, namely $t_2 - t_1$.

Figure 10:
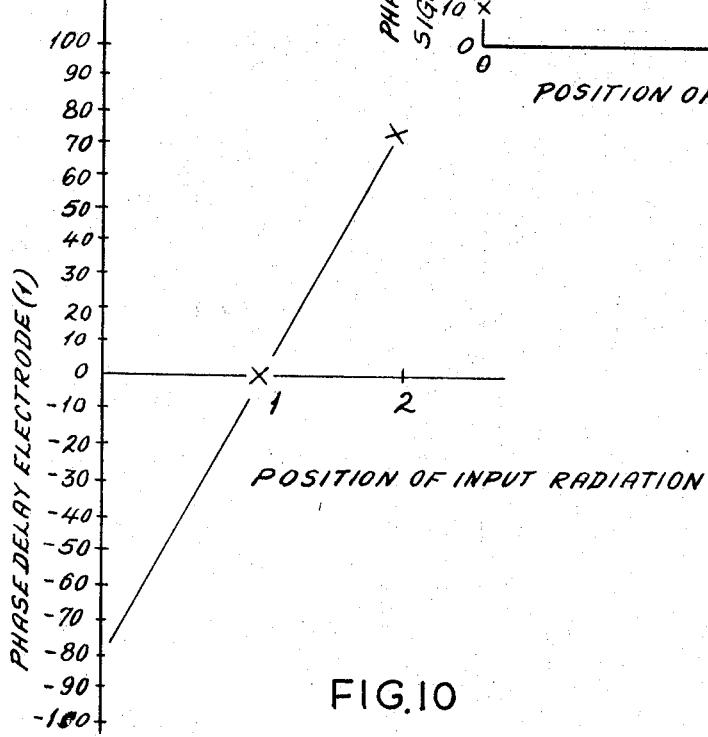

The graph in FIG. 10 is similar to the graph in FIG. 9 but is for the continuous wave situation and therefore is measured in phase delay instead of time delay.

Thus it can be seen that the subject detector operates on the principle that a nonuniformly irradiated p-n junction produces photovoltages that are parallel or nearly parallel to the junction, and that by proper placement of one or more pairs of the electrodes 28 and 30 on one surface as described an X-Y coordinate system can be established to provide rectilinear position data of an image from a radiation object. In the past, various methods of extracting positional information from lateral photodetectors have been investigated. These have included devices using amplitude detection, phase detection, pulse or step detection and impulse detection. Some of these devices have serious disadvantages. Amplitude detection for instance depends both on the position of the impinging image and on the image intensity. This is not so of the present construction for the reasons stated, namely that input intensity or amplitude have no significance as long as they are sufficient to generate detectable outputs. Also, varying levels of background signals in the known device will alter the detector sensitivity and will shift the null position and distort the lateral voltage grid-plots. To some extent these difficulties of the prior art constructions can be overcome by adding complicating devices such as electronic compensation means, automatic gain control means, biasing means including both electrical and optical biasing means, and various other means, none of which are required with the present device.

The present time or phase detecting means have the further advantage over known forms of detectors including amplitude detectors in that time or phase difference is sensed independently of amplitude or intensity, and this is accomplished in the present construction in such a way as to enhance the linearity of the lateral voltage grid-plot thereby tending to make the subject approach more accurate as a locating device. Also the present approach, especially when detecting time differences offers considerable possibilities for use with radiation sources such as pulsed laser sources. This becomes even more important as the cost and power requirements of pulsed laser sources decrease which seems to be happening. The present device also lends itself to being able to recognize particular frequencies or wavelengths so as to be able to follow or track a particular object.

The selection of particular types of semi-conductor materials for use in the subject detector, different sizes and shapes for the detector, and use of detectors having different lateral carrier mobility characteristics sometimes also called resistance characteristics all effect the type of responses that are produced but do not effect the operating principles. For example, a detector that has a relatively low carrier mobility characteristic will have a relatively low frequency response and vice versus. The operating environment may affect the lateral carrier mobility and hence also the response characteristics. Other factors which may have an effect on the operation include the possible use of means placing an electric bias across the junction and so forth. A bias will effect the junction resistance and/or capacitance and these in turn will effect the response characteristics such for example, as the high frequency cutoff of the device. All of these and other factors which effect the operation should be taken into consideration in the design and construction of a detector if the detector is to have certain desired response and frequency characteristics. It is also well known to use reverse biasing in a photovoltaic detector to improve sensitivity. Reverse biasing however, often adversely effects the detectivity or minimum field size that can be detected at the signal-to-noise ratio. As a general rule the semi-conductor materials for use in the subject device should have high charge mobility characteristics, relatively long lifetimes and should be able to sustain high electric fields without breaking down. These characteristics are usually found together in materials with 400 ohm-centimeter resistivity or higher. These and other parameters should be taken into account in designing a detector having a particular set of desired operating characteristics. Also as indicated it is anticipated to provide the subject detector with more than one pair of spaced electrodes similar to the electrodes 28 and 30 but oriented on the detector on different diameters thereof such as on diameters located at right angles to provide location information in two directions.

Thus there has been shown and described a novel lateral detector capable of measuring time and phase delay characteristics due to the lateral characteristics of the detector independently of the amplitude and intensity of the input radiations to produce positional information, which detector fulfills all of the objects and advantages sought therefor. It will be apparent to those skilled in the art, however, that many changes, modifications, variations and other uses and applications of the subject detector are possible and within the intention and scope of the invention. All such changes, modifications, variations and other uses and applications which do not depart from the intention and scope of the invention are deemed to be covered by the invention which is limited only by the claims which follow.

What is claimed is:

1. A detector device comprising a wafer-like element formed by contiguous layers of p and n type semiconductor materials arranged and positioned to form a barrier therebetween, means forming a conductor layer on one of said layers on one side of the device, means biasing said conductor layer to a predetermined operating condition, a second electrode attached to the other semi-conductor layer at a location thereon spaced laterally from the conductor layer on the opposite side of the device, voltage sensitive means connected to said second electrode including means responsive to the time of occurrence of voltages produced thereat when radiation energy impinges on the said one semi-conductor layer, the time of occurrence of the voltage produced at said second electrode depending on the distance between where the radiation energy impinges and the said electrode and on the charge carrier mobility characteristic of at least one of the layers of semiconductor material in a direction substantially parallel to the barrier.

2. The detector device of claim 1 wherein at least two of said second electrodes are attached to said other semi-conductor layer at spaced locations thereon, and similar voltage sensitive means connected respectively to each of said second electrodes, the voltage responses produced by the said respective voltage sensitive means depending on the distance between where radiations impinge thereon and the respective second electrodes and the charge carrier mobility of the semi-conductor material in at least one of the said contiguous layers.

3. The detector device defined in claim 2 wherein two pairs of spaced second electrodes are attached to the said other semi-conductor layer, the electrodes of one of said pairs being angularly oriented on said other layer relative to the electrodes of said other pair.

4. A lateral detector for use in determining the position of objects having means thereon for radiating energy comprising a wafer-like detector element having opposite surfaces, said detector element being formed by contiguous layers of different semi-conductor materials arranged to form a junction therebetween, a peripheral electrode attached to one of said opposite surfaces of the element to define on said one surface a surface region therewithin, at least one pair of spaced electrodes positioned on the other opposite surface of the detector element at locations thereon opposite said surface region, and means connected respectively to each of the electrodes of said pair including means responsive to the time of occurrence of voltages produced thereat to produce electric signal responses thereat when radiations from the object impinge on the said detector element in the said surface region, the signal responses produced at said electrodes being delayed relative to the time of radiation impingement by an amount of time that depends on the distance between the location where the radiations impinge and the respective electrodes of said pair and on the charge carrier mobility of the semi-conductor material in at least one of said element layers in a direction substantially parallel to the junction.

5. The lateral detector defined in claim 4 wherein the detector element is round and the peripheral electrode is annular.

6. The lateral detector defined in claim 5 wherein the pair of spaced electrodes are located equal distances on opposite sides of the center of the round surface region defined by the annular electrode.

7. The lateral detector defined in claim 4 wherein the energy radiating means on the object include a source of optical energy of predetermined frequency, the semi-conductor materials selected for use in the detector element having resistivity characteristics in a range extending upwardly from 400 ohm-centimeters and impedance characteristics capable of responding to the frequency of the radiating energy.

8. The lateral detector defined in claim 4 wherein the peripheral electrode is biased to a predetermined operating voltage condition.

9. The lateral detector defined in claim 4 wherein the means on the object for radiating energy includes a source of optical pulses.

10. The lateral detector defined in claim 4 wherein the means on the object for radiating energy includes a source of continuous wave optical energy.

11. The lateral detector defined in claim 4 including two pairs of spaced electrodes, the orientation of the electrodes in each pair being angularly related to each other.

12. Means for locating remote objects that have means thereon for radiating optical energy comprising a detector element constructed of adjacent layers of different types of semi-conductor materials arranged to form a junction therebetween, means for exposing one of said layers to the energy radiating from said object, an electrode element positioned on said one element layer, said electrode element being shaped to circumscribe an area of said one layer for exposing to the said radiating optical energy, at least one pair of spaced electrodes positioned on the other of said element layers at locations on the detector element opposite from the area circumscribed by the said electrode element, means electrically biasing the electrode element to a predetermined voltage condition, and similar voltage responsive means connected respectively to each of said electrodes of said pair, said occurrence of voltages produced thereat when irradiating optical energy impinges, optical radiations impinging on said detector element in the said circumscribed area producing voltage responses at each of the respective spaced electrodes which are detected by the said respective voltage responsive means connected thereto, the time of occurrence of the voltage responses sensed at each of said spaced electrodes being delayed relative to the time the radiations impinge on the said circumscribed area by an amount of time that depends on the charge carrier mobility characteristic of at least one of said semi-conductor layers in a direction substantially parallel to the junction and on the distance between where the radiations impinge and the respective electrodes of said pair.

13. The means for locating remote objects as defined in claim 12 wherein at least one of said adjacent layers of semi-conductor material has resistive and capacitive characteristics which define and limit the range of frequency of impinging optical radiations that can be detected.

14. The means for locating remote objects as defined in claim 12 wherein the means electrically biasing the electrode element include means for electrically grounding the electrode element.

15. Means for producing positional responses based on measurements of time delay, said means being located to be exposed to pulses of optical radiations from a radiation source comprising a semi-conductor detector element having opposite surfaces and being formed by contiguous layers of p and n type semi-conductor materials, means forming a conductor element on one of the opposite surfaces of the detector element, said conductor element circumscribing an area of said surface the center of which is at a determinable location, at least one pair of spaced electrodes attached to the detector element on the opposite surface thereof from the said conductor element, said electrodes being located opposite the area circumscribed by the conductor element and at locations thereon that are in alignment with each other and with the determinable center location of said area, means connected respectively to each of said spaced electrodes including means responsive to the time of occurrence of voltages produced thereat for producing electric responses when an optical pulse impinges on the detector element in the circumscribed area, the semi-conductor material in at least one of the contiguous layers having a charge carrier mobility characteristic at least equal to about 400 ohm-centimeters in a direction substantially parallel to the opposite surfaces of the detector such that when an optical pulse impinges on the circumscribed area at a location spaced from the said spaced electrodes a determinable time delay will occur before the electric response produced at the respective spaced electrodes can be sensed by the means connected thereto, the said time delays depending on the distance between where the optical pulse impinges on the detector element and the respective electrodes and on the charge carrier mobility of the said one selected semi-conductor material.

16. The means for producing positional responses defined in claim 15 wherein the source of optical radiation pulses is a mode-locked laser.

17. The means for producing positional responses defined in claim 15 wherein the electrodes of said pair are spaced equally from opposite sides of the determinable center location of the said circumscribed area.

18. Means for producing positional responses based on measurement of phase differences, said means being located to be exposed to optical radiations from a continuously radiating optical source comprising a semi-conductor detector element having opposite surfaces, said element being formed by contiguous layers of $p$ and $n$ type semi-conductor materials, means forming a conductive surface layer on one of the detector surfaces, said conductive surface layer circumscribing an area of said one detector surface the center of which is at a determinable location, at least one pair of spaced electrodes attached to the detector element on the opposite surface thereof from the conductive surface layer, said electrodes being located opposite from the area circumscribed by said conductive layer and at locations thereon aligned with and equally spaced from opposite sides of the determinable center location, means biasing the conductive layer to a predetermined potential condition, means connected respectively to each of the said spaced electrodes including means responsive to the time of occurrence of voltages produced thereat to produce electric signals whenever energy from the continuously radiating optical source impinges on the circumscribed area, the semi-conductor material in at least one of the said contiguous layers having charge carrier mobility characteristics in a direction substantially parallel to the opposite detector surfaces such that when an optical signal impinges on the circumscribed area a detectable phase difference will occur between the impinging optical radiations at the time of impingement and the electric signals produced and detected therefor by the means connected to the spaced electrodes, said phase differences being due to distance between where the optical energy impinges and the respective electrodes and to the charge carrier mobility characteristics of the said one semiconductor material.

* * * * *